Jan. 30, 1923.
W. J. SPIRO.
REPLACEMENT RUNNING BOARD.
FILED FEB. 3, 1922.
1,443,598.
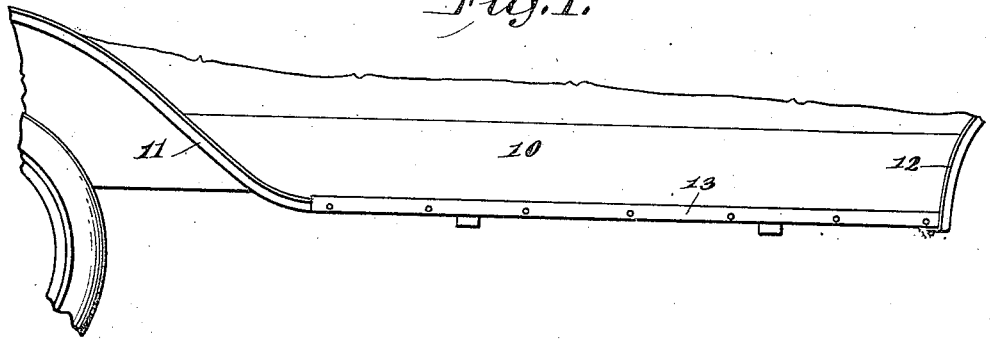
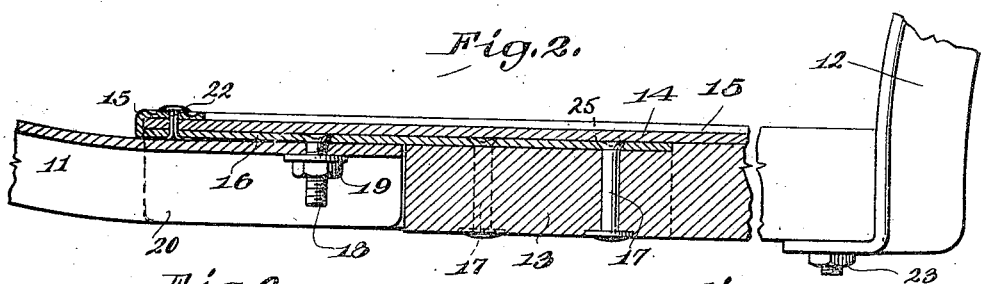
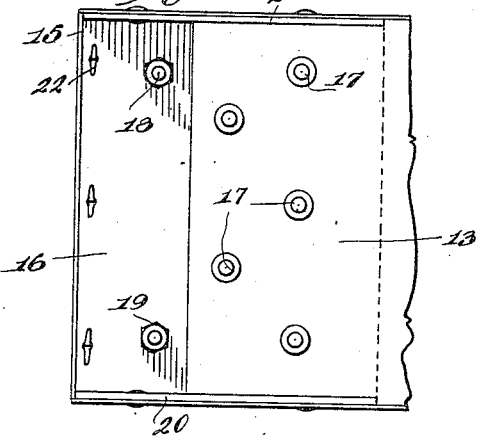
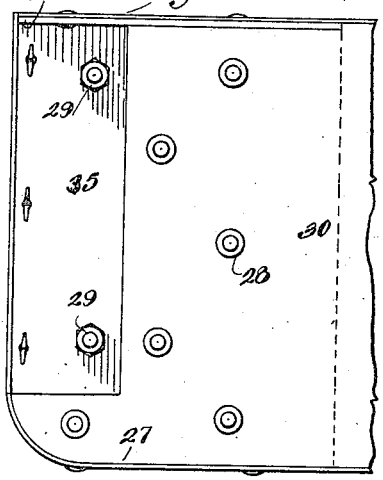
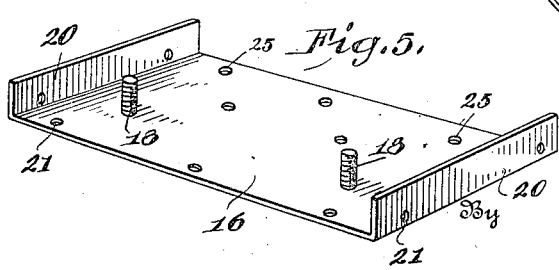
Inventor
Walter J. Spiro
By Alfred T. Gage
Attorney Patented Jan. 30, 1923.

1,443,598

UNITED STATES PATENT OFFICE.

WALTER J. SPIRO, OF WHITE PLAINS, NEW YORK.

REPLACEMENT RUNNING BOARD.

Application filed February 3, 1922. Serial No. 533,881.

*To all whom it may concern:*

Be it known that I, WALTER J. SPIRO, citizen of the United States, residing at White Plains, in the county of Westchester and State of New York, have invented certain new and useful Improvements in Replacement Running Boards, of which the following is a specification.

This invention relates to a replacement running board and particularly to a construction adapted for application to a Ford automobile to replace the light metal running board furnished by the manufacturers by a more substantial and attractive board capable of assemblage without the employment of skilled labor.

The invention has for an object to effect a neat and attractive connection with the inner end of the front fender by means of an extension from the board proper of less vertical thickness than the body of the board. The original metal board is directly secured to the fender ends and if a replacement board of greater thickness be applied the end of the board lies above the level of the rear end of the front fender rendering the connection unsightly and forming a pocket which retains dust and moisture. This condition can only be remedied by re-bending the fender end which requires skilled labor and is liable to damage the finish of the fender. This invention provides means by which a substantially smooth connection may be effected and the front fender end secured directly beneath the tread of the running board by devices carried thereby.

Other and further objects and advantages of the invention will be hereinafter set forth and the novel features thereof defined by the appended claims.

In the drawing—

Figure 1 is a side elevation of the replacement board applied;

Figure 2 is an enlarged longitudinal section thereof;

Figure 3 is a bottom plan of the front end of the board;

Figure 4 is a similar view of a modified form of board; and

Figure 5 is a detail perspective of the connecting plate.

The numeral 10 designates the body of an automobile or other vehicle having the front wheel fender 11 and rear wheel fender 12. Between these fenders a running board is disposed and comprises a body 13 of any desired material having a tread surface 14 of linoleum, rubber, metal or any preferred material secured to the body and finished by an edge molding 15 in the usual manner. At the front end of the board a connecting plate 16 is secured thereto and usually inset flush with the upper surface of the board to prevent unevenness in the tread surface. This plate may be secured to the board in any desired manner, for instance, by rivet bolts 17 extending through the plate and board, as shown in Figure 2. As illustrated in Figure 5 the plate may be formed with openings 25 to receive such bolts, and is also provided with attaching devices for the fender end, such as the threaded bolts 18 riveted at one end to the plate and carrying a clamping nut 19 to engage the fender.

The plate may be varied in form dependent upon the character of board to which it is applied. In Figures 3 and 5 a plate is shown for application to an ordinary board of the same width as the original metal board, and in Figure 4 a modified form of plate is illustrated for use with a special board of greater width than the original board which materially enhances the ornamental appearance of the vehicle and provides more foot room for the user and renders the board safer under slippery conditions. In the form of plate shown in Figure 3, the same is formed with depending flanges 20 which embrace the side edges of the board, and the plate and its flanges are provided with apertures 21 to receive rivets or attaching devices 22 for the molding strips 15. The end of the rear fender may be connected in any desired manner, such as shown at 23. The plate is thus formed without any projections upon its upper face so that a smooth base for the tread is provided.

In the modified form shown in Figure 4, the plate 35 is applied to the upper face of the board 30 and provided with a single flange 26 at the inner side thereof, while the edge 27 of the board extends horizontally beyond the ends of the fenders. This plate is secured to the board by bolts 28 and provided with fender attaching means 29, similar to those described in connection with Figures 3 and 5.

The invention provides a simple and readily applied replacement board in complete form for attachment, which eliminates the objectionable appearance and limited wear of a light metal board while materially improving the appearance of the vehicle. It further provides a neatly fitting board which will not rattle, rust nor sag and having a safe tread for use in wet or slippery weather. The invention is not confined to the specific forms of plate shown, nor to application to the particular type of automobile before mentioned.

What I claim is—

1. In a running board, a metal plate disposed at one end thereof with its upper face in a plane substantially continuous with the upper surface of the board, means for securing said plate to the board, and means secured by the plate for the attachment of a fender end thereto.

2. A running board, a connecting plate disposed upon the upper surface at one end thereof in the horizontal plane of the board, a tread surface overlying said plate and board, an edge molding embracing said surface, and securing means for said molding extending through apertures in said plate.

3. A running board, a flanged connecting plate adapted to embrace the side edges at one end of the board, securing bolts extending through the plate and board, and fender attaching bolts secured to the plate beyond the end of the board and provided with clamping nuts.

4. A flanged fender connecting plate for running boards adapted to embrace a side edge of the board and secured at one end thereto and provided at its opposite end with projecting means for the attachment of an underlapped fender end thereto.

In testimony whereof I affix my signature.

WALTER J. SPIRO.